United States Patent [19]

(12) United States Patent
McIlhany et al.

(10) Patent No.: US 9,739,631 B2
(45) Date of Patent: Aug. 22, 2017

(54) METHODS AND SYSTEMS FOR AUTOMATICALLY PROVIDING POINT OF INTEREST INFORMATION BASED ON USER INTERACTION

(71) Applicant: MapQuest, Inc., Denver, CO (US)

(72) Inventors: Elizabeth Ashby McIlhany, Denver, CO (US); George Michael Ringrose, Hanover, PA (US); Lindsey Young, Wrightsville, PA (US)

(73) Assignee: Mapquest, Inc., Denver, CO (US)

( * ) Notice: Subject to any disclaimer, the term of this patent is extended or adjusted under 35 U.S.C. 154(b) by 34 days.

(21) Appl. No.: 14/242,651

(22) Filed: Apr. 1, 2014

(65) Prior Publication Data

US 2015/0276423 A1    Oct. 1, 2015

(51) Int. Cl.
*G01C 21/36* (2006.01)

(52) U.S. Cl.
CPC ....... *G01C 21/367* (2013.01); *G01C 21/3682* (2013.01); *G01C 21/3697* (2013.01)

(58) Field of Classification Search
CPC ............ G01C 21/3679; G01C 21/3682; G01C 21/3476; G01C 21/3697; B60W 2050/146; B60W 2530/18; B60W 50/14; G06F 3/0486
See application file for complete search history.

(56) References Cited

U.S. PATENT DOCUMENTS

| | | | | |
|---|---|---|---|---|
| 6,154,658 | A * | 11/2000 | Caci | 455/466 |
| 6,401,034 | B1 * | 6/2002 | Kaplan et al. | 701/416 |
| 6,434,482 | B1 * | 8/2002 | Oshida et al. | 701/426 |
| 6,542,812 | B1 * | 4/2003 | Obradovich et al. | 701/426 |
| 7,035,731 | B2 * | 4/2006 | Smith | 701/516 |
| 2004/0128067 | A1 * | 7/2004 | Smith | 701/207 |
| 2004/0172193 | A1 * | 9/2004 | Monde et al. | 701/209 |
| 2007/0203642 | A1 * | 8/2007 | Arnold-Huyser | 701/211 |
| 2009/0265099 | A1 * | 10/2009 | Gottlieb | 701/208 |
| 2010/0088018 | A1 * | 4/2010 | Tsurutome et al. | 701/201 |
| 2011/0144899 | A1 * | 6/2011 | Soelberg | 701/200 |
| 2012/0179319 | A1 * | 7/2012 | Gilman et al. | 701/22 |
| 2014/0005924 | A1 * | 1/2014 | Letz | 701/424 |
| 2014/0129976 | A1 * | 5/2014 | Beaurepaire et al. | 715/788 |
| 2014/0244143 | A1 * | 8/2014 | Elwart et al. | 701/117 |
| 2015/0204688 | A1 * | 7/2015 | Gearhart et al. | |

* cited by examiner

*Primary Examiner* — John R Olszewski
*Assistant Examiner* — Tommy Worden

(57) ABSTRACT

Computer implemented methods are disclosed for providing to a user, geographical mapping information relating to a trip from a start location to a destination location. The method includes receiving user input data including at least the destination location, determining a distance between the start location and the destination is equal to or above a pre-determined threshold, and generating and displaying a route from the start location to the destination location on an electronic map based on the user input data. The route may include a pin that is movable by the user along the route. The location of the pin may be received and a snap location along the route closest to the drop location may be calculated. The method may include animating movement of the pin from the drop location to snap location, and displaying the geographical mapping information based on the snap location.

21 Claims, 6 Drawing Sheets

METHODS AND SYSTEMS FOR AUTOMATICALLY PROVIDING POINT OF INTEREST INFORMATION BASED ON USER INTERACTION

TECHNICAL FIELD

Various embodiments of the present disclosure relate generally to providing geographical mapping information. More specifically, exemplary embodiments of the present disclosure relate to systems and methods for providing dynamic point of interest information, and user-customizable route planning.

BACKGROUND

In recent years, the use of electronic or digital maps and mapping applications has grown significantly. Such mapping applications may be executable by various types of user electronic devices. Examples of such devices include, but are not limited to, a computer connected to the Internet, an onboard navigation system in a vehicle, a dedicated portable Global Positioning System (GPS) device, a mobile computer device (e.g. a smartphone), or other type of GPS-enabled computing device. The displayed electronic maps often convey information related to roads, traffic, buildings, landmarks, terrain, and other geographic locations or regions of interest. Most electronic maps allow users to view various portions of a map (e.g. via scrolling, zooming, rotating, and panning functions)

Some electronic maps may be interactive, receiving initial user inputs such as an input of a specific geographic location and providing map information based on the initial user inputs. Some mapping applications also may include route guidance features allowing users to receive route information or driving directions to a particular address based on each user's initial input of a location or detection of each user's current geographic location, as derived through GPS or other location detecting means.

Interactive maps also may provide information about various points of interest (POIs) at or near a known location. A POI may be, for example, a specific business, destination, or attraction that is useful or interesting to an individual or a group of individuals, or that the individual or the group may want to visit. By way of example, POIs on a digital map may represent gas stations, rest areas, hotels, restaurants, museums, hospitals, historical sites in a specific geographic area, houses for sale, etc. A POI may also correspond to a movie theater showing a particular film, a restaurant that serves a specific type of food, etc.

Digital maps, either interactive or non-interactive, may be used for planning or taking a trip. Such trips may be to the same location (e.g., daily commuting from home to work), new short-distance trips to unfamiliar locations, long-distance vacation road-trips, or any other type of travel. For example, a user may use a digital mapping application executable at the user's device to input origin and destination locations and obtain routing directions to and from the locations. Mapping service providers also may track a user's location using GPS or other location detecting means coupled to a user's electronic device. Based on this location information, the digital maps may provide users with real-time information, such as live traffic information. The digital maps also may provide dynamic routing adjustments for a predetermined or prescribed route of travel when the location of the user's device is tracked.

However, conventional mapping applications or services do not provide advance identification and interactive user consideration and selection of POIs at various points along a planned route.

SUMMARY OF THE DISCLOSURE

Accordingly, a need exists for methods, systems, and devices that provide dynamic user interaction with a route to browse and interrogate POIs along a route and obtain optimized travel information.

According to certain embodiments, computer-implemented methods are disclosed for providing, to a user, geographical mapping information relating to a trip from a start location to a destination location, the method may include: receiving, from a user's electronic device and over a network, user input data including at least the destination location; determining whether a distance between the start location and the destination is equal to or above a pre-determined threshold; generating and displaying a route from the start location to the destination location on an electronic map based on the user input data; displaying on the route, in response to determination that the distance is equal to or above the pre-determined distance, a pin movable by the user along the route; receiving, from the user's electronic device, a drop location where the user has dropped the pin along the route; calculating a snap location along the route closest to the drop location; animating movement of the pin from the drop location to the snap location; and/or displaying the geographical mapping information based on the snap location Aspects of the disclosure relate to one or more of: wherein the pre-determined distance is input by the user; wherein the drop location is within a pre-determined distance from the snap location; animating and displaying movement of the pin along the route to the drop location; wherein route information is automatically updated and displayed based on the movement of the pin along the route to the drop location; wherein calculating the snap location along the route closest to the drop location comprises calculating one or more intersections close to the drop location and determining points of interest (POIs) within a predetermined distance from the one or more intersections; wherein the POIs are based on the user input data; wherein at least one of the one or more intersections is a highway exit; accessing a database of an external content provider based on the drop location and providing a transaction with the external content provider based on the drop location; wherein the pin changes appearance upon movement to the snap location; receiving further user input data after displaying the geographical mapping information based on the snap location; wherein the step of calculating the snap location along the route closest to the drop location is based on the shortest travel time from the drop location to the snap location; wherein the snap location is closer to the destination location than the drop location; wherein the snap location is closer to the start location than the drop location; wherein at least one of the start location and the destination location are movable; and/or receiving an intermediate location between the start location and the destination location from the user.

According to another embodiment, systems are provided for providing to a user geographical mapping information relating to a trip from a start location to a destination. Certain systems may include: a data storage device storing instructions for causing computer servers or mobile devices to provide to a user geographical mapping information relating to a trip from a start location to a destination, and a processing device configured to execute the instructions to perform a method of: receiving, from a user's electronic device and over a network, user input data including at least the destination location; determining whether a distance between the start location and the destination is equal to or above a pre-determined threshold; generating and displaying a route from the start location to the destination location on an electronic map based on the user input data; displaying on the route, in response to determining the distance is equal to or above the pre-determined threshold, a pin movable by the user along the route; receiving, from the user's electronic device, a drop location where the user has dropped the pin along the route; calculating a snap location along the route closest to the drop location; animating movement of the pin from the drop location to the snap location; and displaying the geographical mapping information based on the snap location.

According to certain embodiments, a computer-readable medium is disclosed that, when executed by a processor causes the processor to provide, to a user, geographical mapping information relating to a trip from a start location to a destination, the method including: receiving, from a user's electronic device and over a network, user input data including at least the destination location; determining whether a distance between the start location and the destination is equal to or above a pre-determined threshold; generating and displaying a route from the start location to the destination location on an electronic map based on the user input data displaying on the route, display on the route, in response to determining the distance is equal to or above the pre-determined threshold, a pin movable by the user along the route; receiving, from the user's electronic device, a drop location where the user has dropped the pin along the route; calculating a snap location along the route closest to the drop location; animating movement of the pin from the drop location to the snap location; and/or displaying the geographical mapping information based on the snap location.

The disclosed embodiments achieve convenient trip planning by dynamically determining and displaying points of interest along a route in response to user input and presenting a customized route based on the user input.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
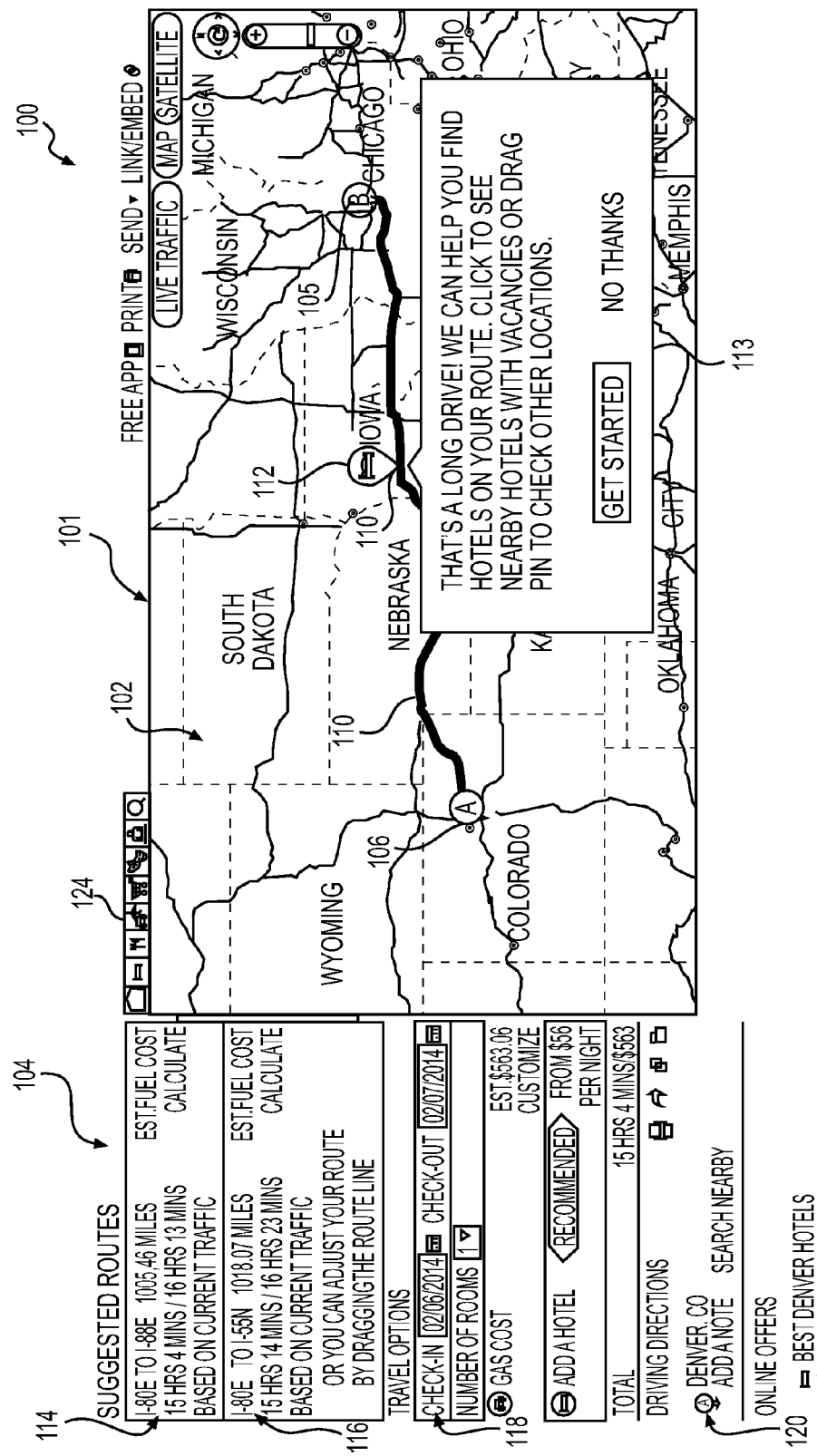
FIG. 1 is a diagram illustrating a graphical user interface (GUI) displaying an interactive digital map and content related to the digital map.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for providing and electronically presenting mapping information related to a trip. In particular, the present disclosure describes methods and systems for providing a graphical user interface (GUI) for discovering points of interest (POIs) along a route on a digital map. In addition, the present disclosure describes methods and systems for determining and dynamically presenting users with POI and route information based on the user's interaction with the digital map.

Referring now to the figures, FIGS. 1-4 are illustrations of different views 100, 200, 300, 400 of a GUI 101 having an electronic map 102 and a map information portion 104. The GUI 101 may be provided by a mapping service provider or any other entity and may include various graphical icons and visual indicators. The GUI 101 may be presented on any suitable electronic device having a display. In some embodiments, the GUI 101 may be accessible (e.g., for viewing and interacting) on a website accessible by an electronic device. In other embodiments, the GUI 100 may be accessible on a mobile navigation application of an electronic device. In such embodiments, the view of the digital map 101 may be automatically updated or panned over based on detecting, via GPS or in any other suitable manner, the current location of the electronic device.

The digital map 102 may be of any suitable form and/or type of view, such as a map view, satellite view, live traffic view, etc. The digital map 102 may be any suitable size to be displayed by an electronic device on the GUI 101. The view of the digital map 102 may be manipulated in any suitable manner, (e.g., zoomed in and out, rotated, etc.). The digital map 102 may be of any scale, e.g. transcontinental, continental, region, state, city, neighborhood, campus, etc. The digital map 102 also may include various identifiers, e.g. geographic markers, landmarks, road names, etc. and may be automatically electronically updated.

The digital map 102 may include a route 110 between a start location 106 and one or more destination locations 108. The start and/or destination locations 106, 108 may be any locations identifiable on the digital map, for example, a specific address (e.g. 123 Green St. Any town, CA), POI location (e.g. Wrigley Field), general geographic location (e.g. Denver, Colo.), intersection (e.g. 1$^{st}$ St. and Broadway, exit 29A), etc. The start and destination locations 106, 108 may be any distance from each other and/or any direction relative to each other.

The route 110 may be along one or more portions of local streets, highways, bridges, etc. The route 110 may be traversed in any suitable manner, e.g., via motor vehicle, bicycle, foot, public transit, etc. The route 110 also may include various visual indicators to identify various attributes of the route 110. For example, traffic flow along the route 110 at various times may be identified using different colors or combination of colors, visual effects (e.g. animation, pop-up notes, etc.), etc. Road restrictions, tolls, bridge heights, construction, etc., also may be shown along the route 110.

The GUI 101 may display one or more interactive icons, such as movable pin 112 on the digital map 102 based on properties of the route 110. In certain embodiments, an interactive icon may be displayed if it is determined that the route has a total travel time or travel distance above a certain pre-determined threshold. In other embodiments, an interactive icon may be displayed if it is determined that travel is occurring at a certain time of day (day/night) or date (week day/weekend/holiday/etc.) The moveable pin 112 may be associated with POI information along the route 110. The movable pin 112 may be any suitable size, shape, color, etc. For example, movable pin 112 may include a representative symbol for a hotel, restaurant, gas station, café, etc. In some embodiments, the moveable pin 112 may include an input field for the user to designate a specific POI or category of POI. For example, the user may designate the pin 112 to be for a fast food chain, coffee shop, donut shop, pharmacy, etc. Based on the input by the user, the pin 112 may include a particular symbol associated with the designation and saved in memory or include the inputted text on the pin 112.

As shown in FIGS. 1-4, pin 112 may be displayed on the route 110 or any other portion of the digital map 102 along with a pin information portion 113 (PIP) which may include a visual prompt providing the user with the option of viewing POI information along the route 110. For example, as shown in FIG. 1, the PIP 113 may provide the user with the option of finding hotels on the route 110. In other embodiments, the PIP 113 may include information about various POI characteristics or parameters, such as restaurant hours, menu items, prices, drive-thru availability, etc. The PIP 113 may be any suitable size and shape and may have various suitable properties. In some embodiments, portions of the PIP 113 may be transparent to allow the map 102 and route 110 to be viewed. The pin 112, and PIP 113 may be displayed in any suitable manner. The pin 112 may be moved along the route 110 in any suitable manner, such as via a mouse, via a touchscreen, voice command, keyboard, stylus, etc. The pin 112 may move along the route 110 any suitable distance and at any suitable speed. In some embodiments, the movable pin 112 may move smoothly over the route and the speed of movement of the pin 112 along the route may be correlated to the movement of the mouse, etc.

The map information portion 104 of the GUI 101 may include any suitable information related to the digital map 102 and/or the route 110. Each component of the map information portion 104 may be configured to be interactive and configured to receive input information from the user. In some embodiments, as shown in FIG. 1, the map information portion 104 may include a recommended route summary 114, and one or more alternative route summaries 116.

The route summaries 114 and 116 may include information about any major components of the route (e.g. highways, tollways, bridges, etc.), total travel time, total travel distance, estimated fuel cost, etc. The map information portion 114 also may include POI information options 118. For example, as shown in FIG. 1, POI information option 118 may include a search for hotel room vacancies, restaurant table reservations, event seating, etc. The map information portion 104 also may include a portion 120 for user notes, and a detailed route information portion 122. The detailed route information portion 122 may provide step-by-step directions and may be modified based on the user's preferences. For example, as shown in FIG. 1, the user may choose not to show the first few steps of the directions.

Figure 2:
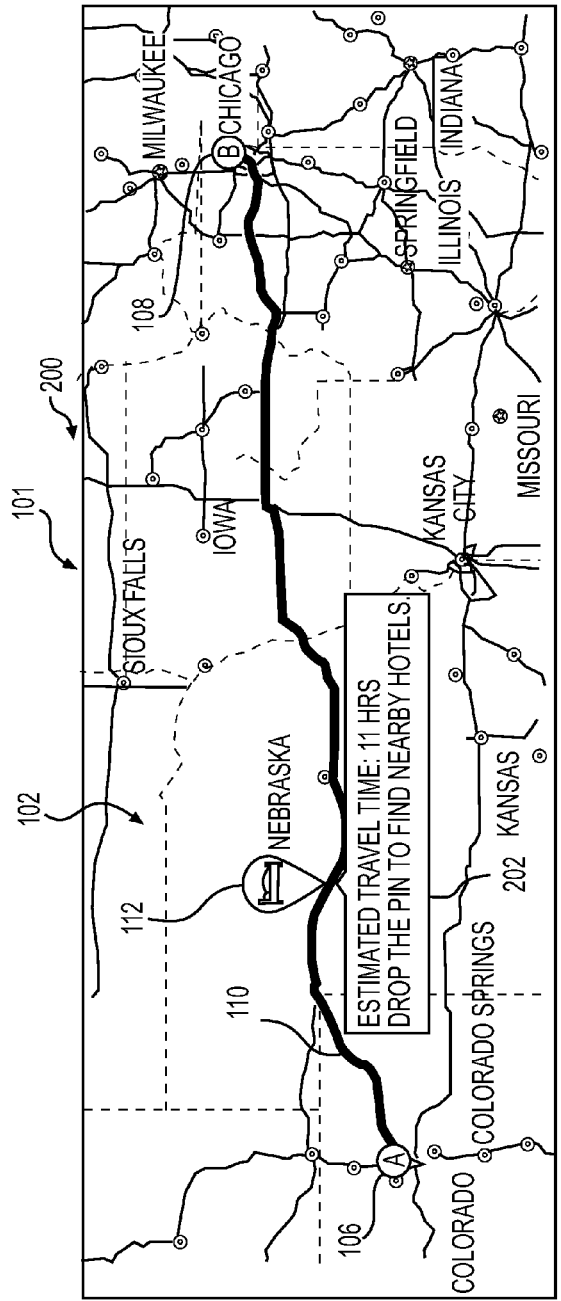
FIG. 2 is a diagram illustrating a route presented on the digital map of FIG. 1 having interactive components.

FIG. 2, shows a view 200 of the digital map 102 of the GUI 101. As shown in FIG. 2, view 200 shows the pin 112 on the route 110 and PIP 213 displaying information about the route 110 and/or instructions for interacting with the GUI 101 to receive additional POI information. In some embodiments view 200 is displayed based on one or more properties of the route. For example, view 200 may be displayed on GUI 101, if the route is determined to meet or exceed a certain pre-determined travel time or distance threshold. Examples of information displayed in PIP 213 may include total estimated travel time, total estimated distance, etc. Examples of instructions for interacting with the GUI 101 may include instructions on moving the pin 112 to find POIs near the location of the pin 112. For example, the PIP 213 may instruct or prompt the user to drag, drop, and/or interact in any suitable manner with the pin 112 to a location on or near the route 110 to find nearby hotels or any other POI. During display of the pin 112 on the route 110 and the PIP 213, the view of the map 102 may be automatically zoomed in, panned, and/or rotated as shown in FIG. 2.

Figure 3:
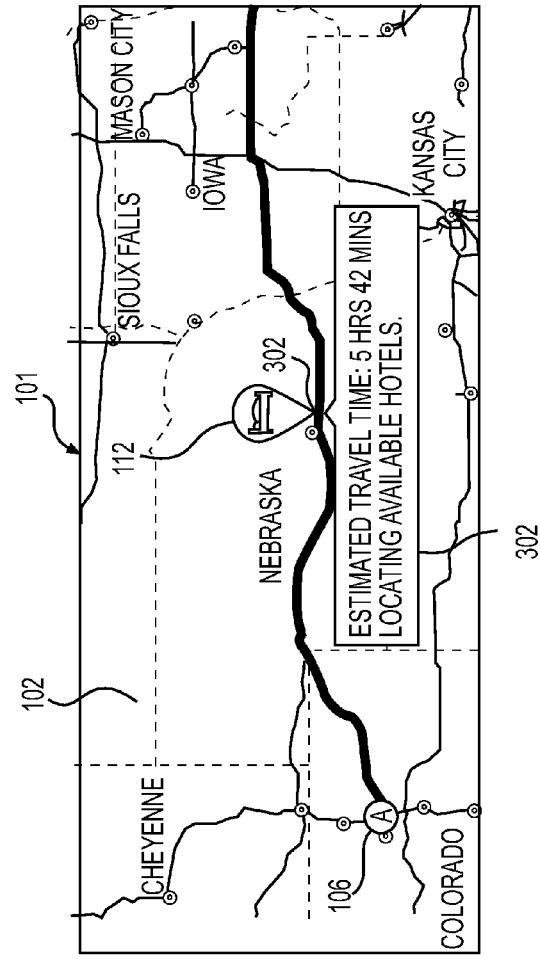
FIG. 3 is a diagram illustrating a user's interaction with the digital map of
FIG. 1.

FIG. 3 shows a view 300 of the digital map 102 of the GUI 101 following user interaction with the pin 112. As shown in FIG. 3, the pin 112 may be moved by the user to a location 302 along the route 110 and PIP 313 may display updated information about the route 110 based on the location 302 of the pin 112 along the route 110 and/or POI information. For example, the user may move and drop pin 112 on a point 302 along the route 110. Information in the PIP 313 may be updated in response to the drop location of the pin 112. The PIP 313 may then display a message informing the user that the user's request is being processed. For example, the user may move the pin 112 to a location from the route 110 to locate hotels close to the pin location 112.

Figure 4:
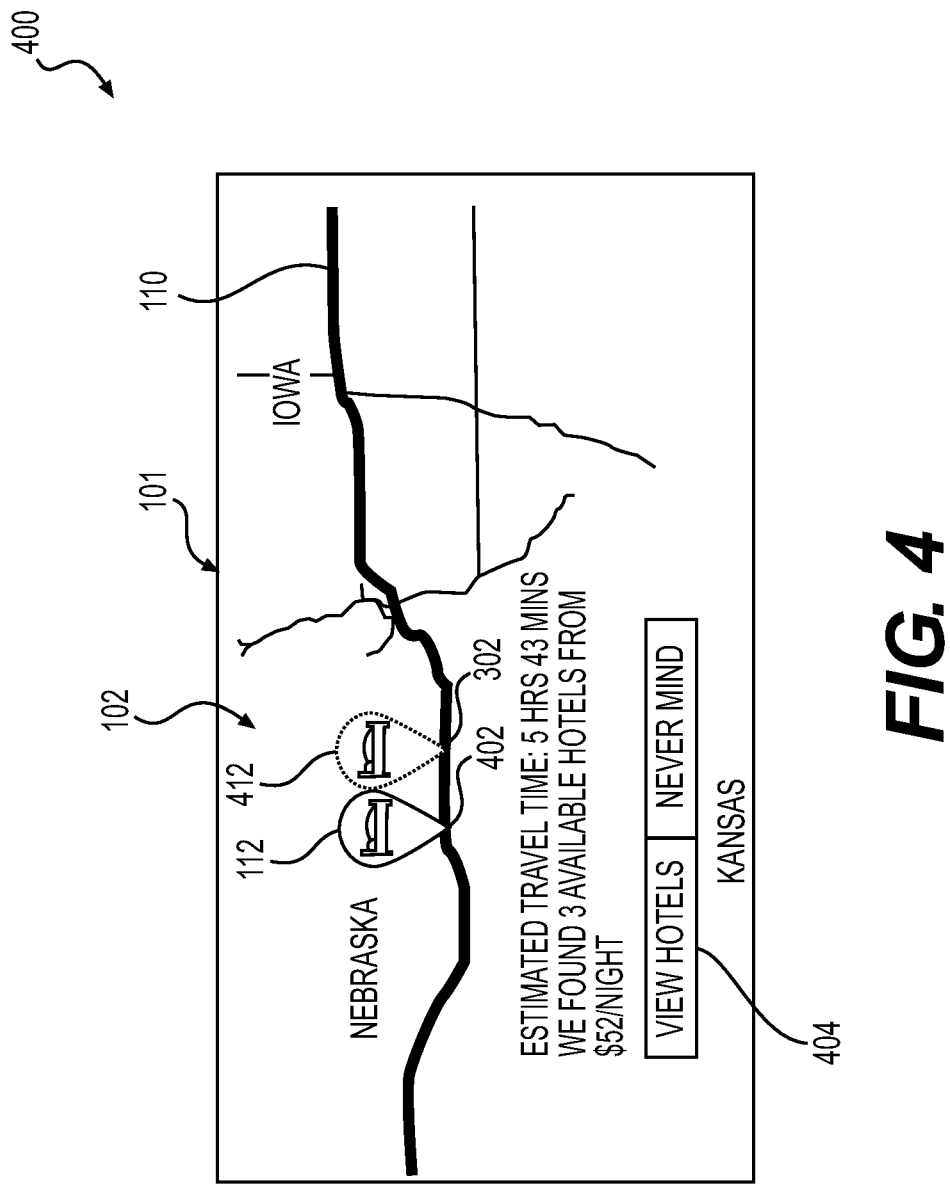
FIG. 4 is a diagram illustrating animation of a portion of the digital map of FIG. 1 based on the user's interaction with the digital map.

FIG. 4 shows a view 400 of the digital map 102 of the GUI 101 following processing of the user interaction with the pin 112. As shown in FIG. 4, the pin 112 may move from the location 302 where the user dropped the pin 112, to a snap location 402 along the route 110. The snap location 402 may be any suitable location along the route, such as a known intersection or highway exit. The movement of the pin 112 from location 302 to snap location 402 may be animated in any suitable manner. For example, by showing the pin 112 moving along the route 110 from location 302 to location 402, vanishing the pin 112 from location 302 and re-showing the pin 112 at location 402, or any other suitable manner. PIP 414 may display updated route information based on the location of the pin 112 and/or a message prompting the user to receive POI information. For example, PIP 414 in FIG. 4 prompts users to view hotel information at location 402.

Figure 5:
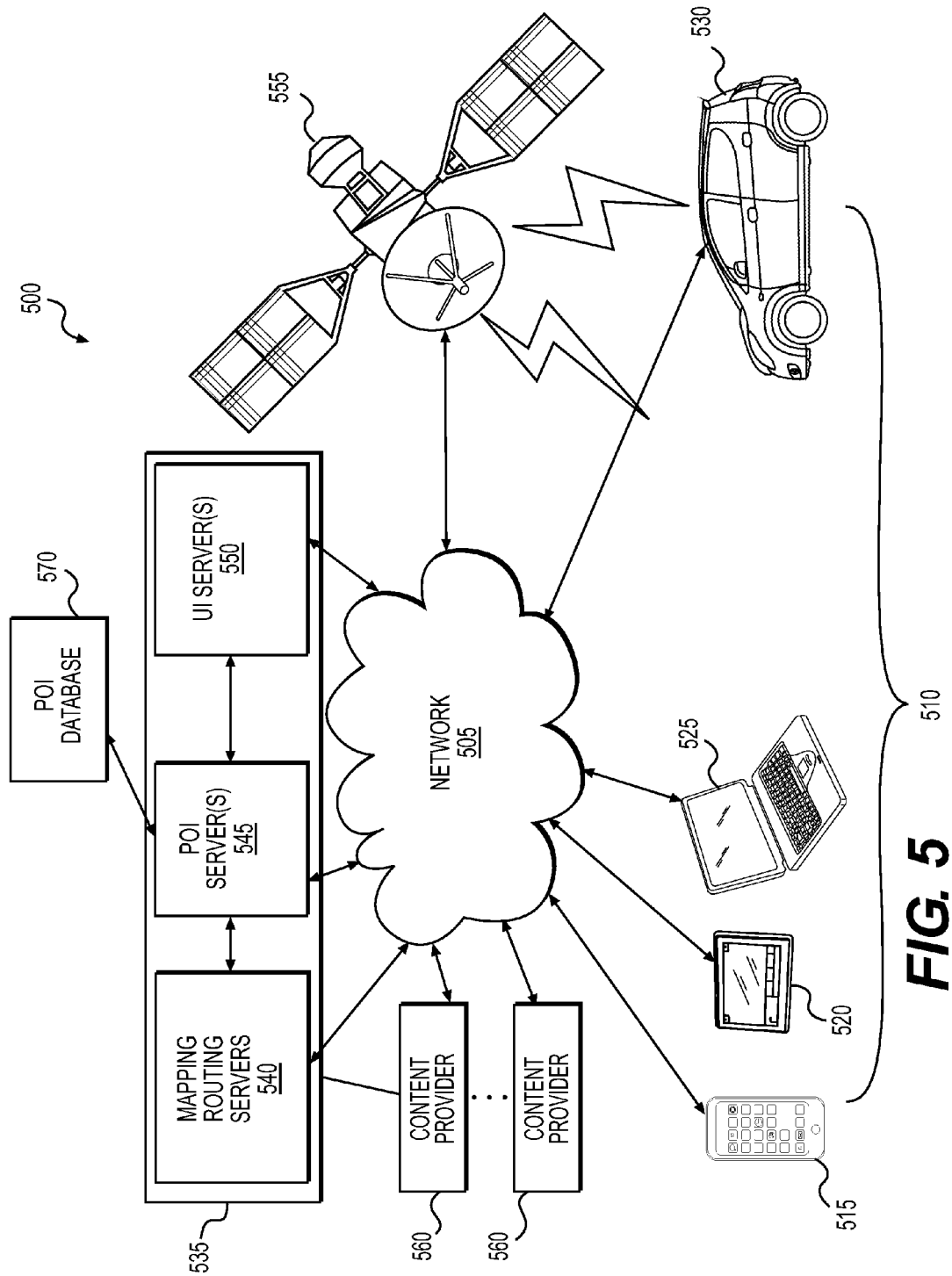
FIG. 5 is a block diagram of a communications system configured to present users with automatically generated dynamic routes between a start location and a destination location and points of interest information, according to an exemplary embodiment of the present disclosure.

FIG. 5 is a block diagram of a communications system 500 capable of presenting routes and route information for a trip, between at least two points. For example, along a route 110 between start location 106 and destination location(s) 108 via a network 505, such as the Internet, to one or more electronic devices 510, such as a mobile device 515 (e.g., mobile phone, personal digital assistant, tablet computer), a GPS device 520, a computer (laptop, desktop, tablet) 525, in-vehicle navigation system 530, and/or any device connected to a network 505, such as the Internet, according to an exemplary embodiment of the present disclosure.

The electronic device 510 may receive information via the network 505 from a system of servers 535, having one or more servers such as mapping/routing 540, POIs 545, user interface servers 550, and/or any other suitable servers. Each server may include memory, a processor, and/or a database. For example, the mapping server 540 may have a processor configured to retrieve mapping information and generate routing information, POI server 545 may have one or more databases of POIs or be in communication with an external POI database 570. The POI server 545 also may include a processor configured to retrieve POI information and provide POI information, and user interface server 550 may be configured to receive and process user input such as the drop location of the pin 112. The system 500 also may include a satellite 555 configured to send and receive location and other information to the server system 535 and electronic devices 510.

The various electronic devices 510 may communicate with each other by any suitable means (e.g., via the network 505, Bluetooth, Near Field Communication, or any other suitable means) to send and receive location and other information. For example, a mobile device 515 may communicate with a GPS device 520, 530 in communication with the satellite 555.

The mapping server 540 may receive information regarding a user's trip, such as a start location, destination location, and any user route preferences directly from the electronic device 510 via the network 505 or indirectly via the user interface server 550. The mapping server 540 may save the information in memory, such as a computer readable memory.

The mapping server 540 also may be in communication with one or more other servers, such as the POI server 545 and/or external servers such as servers of content providers 560. The content providers 560 may include advertisers, news sources, entities affiliated with POIs (e.g. ad agents, marketers). In one embodiment, the content provider 560 may be a hotel chain owner providing advertisement and information regarding room vacancies for hotels along the route. In other embodiments, the content provider may be restaurant chains providing advertisement information regarding seasonal menu items and locations. Other examples may include retail stores, amusement parks, etc. providing advertisements about their locations. In addition, the mapping server 540 may include data from other users, traffic reports, weather reports, police reports, and/or any other source of relevant information and the POI server 545 may include reviews of POIs, details about POIs and/or any other relevant information. The mapping server 540 may process the information for display on the electronic device 510.

Figure 6:
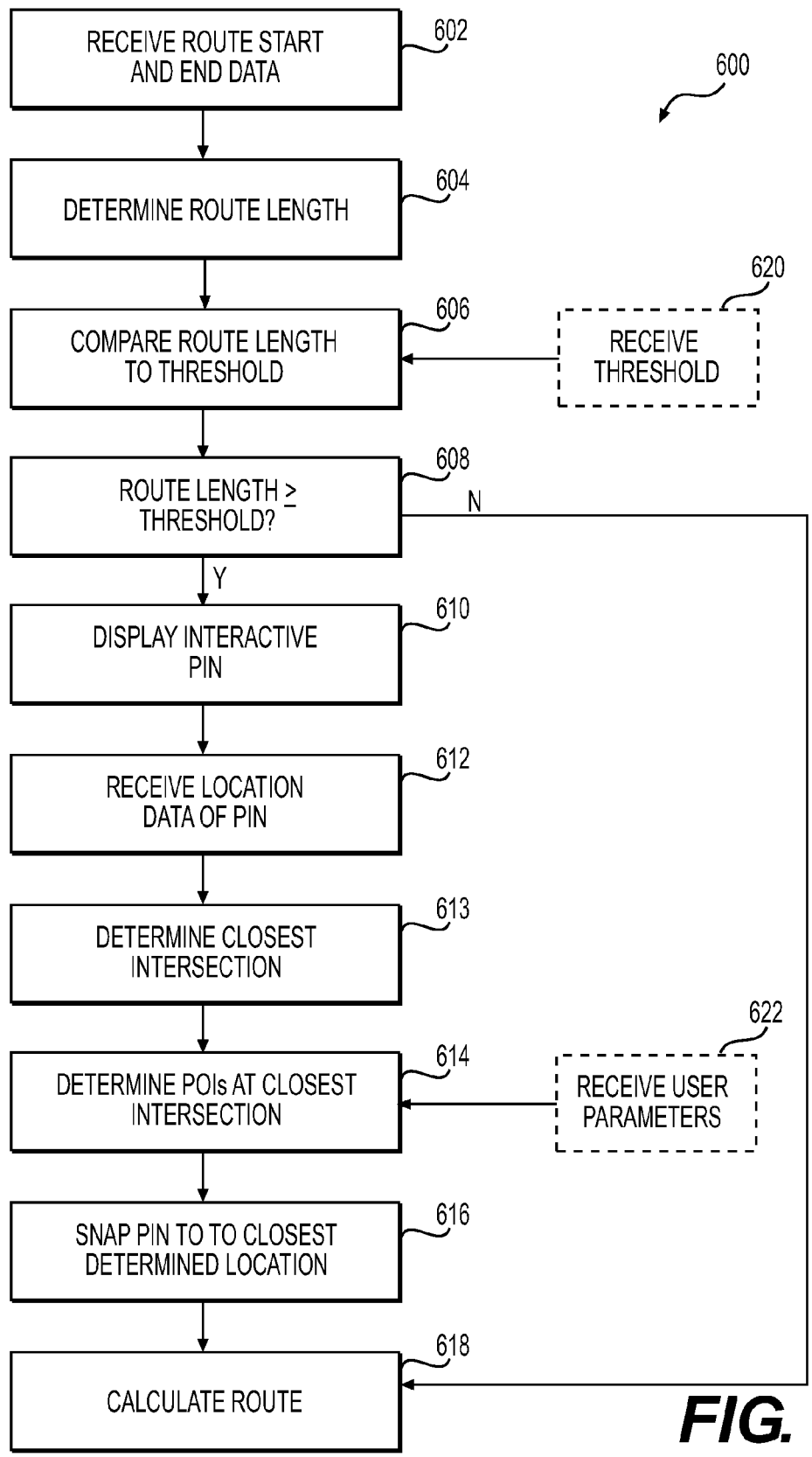
FIG. 6 is a flow diagram of an exemplary method of automatically generating and providing to a user dynamic route and points of interest information for a route between a start location and a destination location, according to an exemplary embodiment of the present disclosure.

FIG. 6 is a flow diagram 600 of an exemplary method of providing mapping information relating to a route, such as route 110. The method 600 may be used for providing a recommended route, and/or providing dynamic user selectable POIs along the route. The method 600 may be performed by any component or combination of server(s) 535, and/or electronic devices 510.

In one embodiment, method 600 may include a step 602 of receiving, from a user's electronic device, over a network, start, and destination locations of a route. The start and/or destination locations may be inputted by a user using any suitable input, such as a touchscreen, keyboard, voice commands, scanned code, etc. Alternatively, the start location may be automatically detected based on detecting the location of the electronic device via GPS or any other location determining technology. The user also may input one or more route parameters, such as route preferences (e.g. avoid tollways, avoid bridges, avoid tunnels, shortest distance, fastest route, etc.)

At step 604, the start and destination locations along with any user-inputted parameters may be processed by the mapping/routing server. Based on the processed information, a recommended route and any alternative routes between the start and destination location(s) may be calculated. In addition, the travel time, distance, and any other properties of the route (e.g. live traffic, traffic patterns, weather conditions, road construction, road closures, road restrictions, fuel usage, etc.) along the recommended and any alternative routes may be determined at step 604.

At step 606 the travel time and/or the travel distance along the route calculated in step 604 may be compared to a threshold value. The threshold may be pre-determined by the provider of the mapping service or inputted by the user at step 620. The threshold may indicate that one or more stops or breaks may be suitable along the route. The threshold may be any suitable travel time or distance. For example, the threshold may be equal to or greater than 90 minutes, over 100 miles, or any other suitable measure of travel time or distance. In some embodiments, the pre-determined threshold may be determined based on the type of travel (e.g. via motor vehicle, by public transport, via foot, via bicycle). For example, the fuel consumption properties of the vehicle travelling along the route may also be used to determine the threshold value. In some embodiments, the time of day or any other suitable trip characteristic may be used to determine the pre-determined threshold. For example, if the user is travelling the route at night, the threshold value determination may be less than if the user is travelling during the day, based on the increased likelihood that the user may require a break (e.g. sleep at a hotel) at night. In this example, the threshold value may be calculated based on the time the travel started and the fatigue level, normal sleep times, or any other suitable factors. In other embodiments, the pre-determined threshold for showing food locations may be based on inputted or determined (e.g. via accessing the electronic schedule or calendar of the user) information regarding the user's schedule.

In some embodiments, the user may input a threshold at step 620. The user may input any travel time or travel distance. In some embodiments, instead of inputting a travel time or travel distance, the user may input a particular POI (e.g. highway rest stops, outlet malls, etc.) at step 620. For example, the route may have a travel distance of one hour and the pre-determined threshold may be 75 minutes, however, the user may input a threshold of "outlet malls." In this example, any outlet malls along the route may be searched and determined to be 45 minutes along the route. Based on the user input at step 620, the user inputted threshold is met and a stop may be recommended at the location of the outlet mall. At step 608, if it is determined that either the pre-determined threshold or any user inputted threshold at 620 is not met, then, at step 618 the route(s) determined at step

604 may be calculated and step-by-step directions may be displayed to the user on the electronic device. At step 608, if it is determined that the threshold is met, then the digital map may display further interactive features as described in reference to steps 610-618 below.

At step 610, if it is determined that the distance/time equals or exceeds the threshold, then one or more interactive pins, such as the interactive pin 112 in FIGS. 2-4 may be displayed on the digital map along with one or more of the routes determined at step 604. The interactive pin may be displayed at any suitable location on the digital map 102 and may include a PIP 113. The PIP 113 may include any suitable information about the route 110 along with a prompt to the user to interact with the pin 112 as discussed above in reference to FIGS. 1-4.

At step 612 the location of the pin 112 on the digital map 110 following the user's interaction with the pin 112 may be received and processed to determine the geographic location and/or corresponding travel time value of the pin 112 along the route 110. For example, the geographic co-ordinates (e.g. 41.88323, −87.624509), address (e.g. 100 N. Michigan Ave. Chicago, Ill.), and/or travel time from the start location or to the destination location (e.g. 5 hours 23 minutes). The determination may be done in advance of travel, and/or in some embodiments may be calculated in real-time. In some embodiments, fuel usage may be calculated in advance, and/or in real-time. The user may move the pin 112 in any suitable manner on the digital map 102. In some embodiments, the pin 112 may be restricted to movement along the route 110. In some embodiments, the pin 112 may be moved anywhere on the digital map 102 and then dropped on a location on the route 110.

At step 613, the location of the pin 112 following the user's interaction may be saved into memory and a search may be generated for known intersections in close proximity (travel distance and/or travel time) to the location of the pin 112. The intersections may be any suitable intersection or travel junction. In some embodiments, the intersections may be major roads, highway exits, etc. The closest intersections to the pin location at step 612 from the nearby intersections may be determined in any suitable manner and may be based on travel time, travel distance, ease of accessibility (e.g. exit ramp access to and from the intersection, etc.) The closest intersection(s) may then be saved and memory for further processing.

At step 614 a search may be generated for POIs close to the closest intersection(s) determined at step 613. The POI search at step 614 may include all suitable POIs, one or more categories of POIs (e.g. hotels, restaurants, stores, etc.), and/or be based on various user inputted parameters (e.g. coffee shops with free Wi-Fi, etc.) At step 614 the POIs may be searched within a predetermined distance or travel time from the closest intersection. The pre-determined search distance/travel time may be set by the provider of the mapping service or the user. In some embodiments, the predetermined search distance/travel time may be the same for each intersection along the route. In other embodiments, the predetermined search travel distance/time may vary based on the type and location of the intersection along the route. For example, the search travel distance/time for POIs closest to an intersection in a major city may be shorter than POIs closest to an intersection in a rural area. If no relevant POIs are found within the predetermined search distance/travel time of the closest intersection, the next closest intersection to the location of the pin may be searched for POIs.

Once an intersection having relevant POIs is determined and saved into memory at step 614, the pin 112 may be moved along the route to the location of the intersection at step 616. At step 616, the movement of the pin 112 along the route 110 to the intersection location may occur in any suitable manner. For example, the pin 112 may be moved along the route 110 via various visual animations, as discussed above in reference to FIG. 4. Information related to the POIs identified at the intersection location of the pin 112 may be displayed on the GUI 101. For example, names, addresses, phone numbers, menus, amenities, etc. In addition, the user may further interact with the GUI 101 to send and receive further information about POIs (e.g. reserve rooms, order food, etc.). In some embodiments, the user may select one or more POIs, and the POIs may be added to the route 110. Any user selected POIs also may be saved in memory. In one example, the user may receive room availability in a hotel identified as being close to the pin 112. In some embodiments, the GUI 101 may allow the user to conduct a transaction with the owner of the POI. For example, the user may book a room in a hotel identified as being close to pin 112.

At step 618, the route may be calculated and step-by-step directions may be calculated and displayed to the user on the electronic device. For example, travel distance/time along a certain highway, landmark associated with an intersection, etc. At step 622 user input parameters may be received at any time during the method 600. For example, the user may filter the POIs by certain characteristics (e.g. hotels with pools, restaurants with drive-thru windows, rest areas with pet areas, etc. In some embodiments, steps 612-618 may be repeated.

Figure 7:
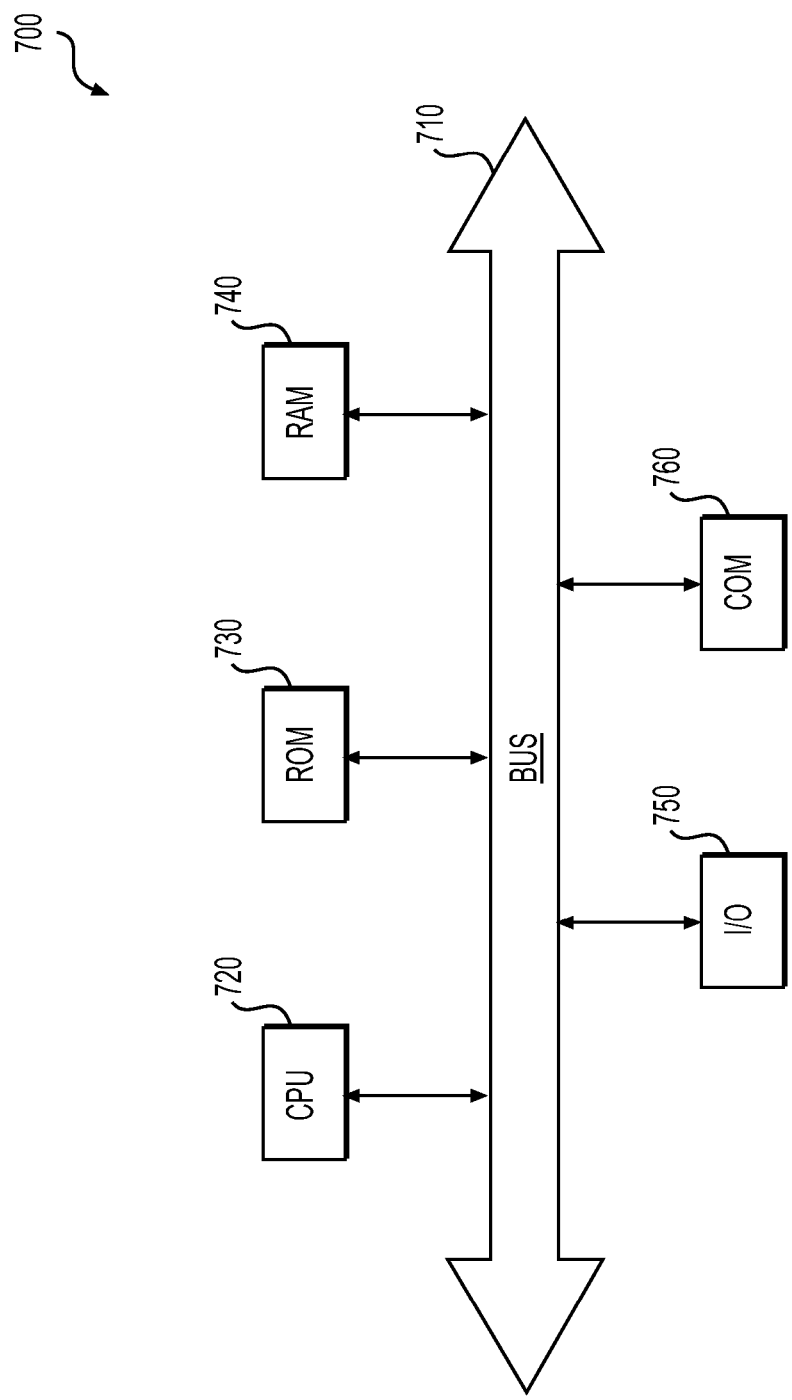
FIG. 7 is a simplified functional block diagram of a computer that may be configured as a host server, for example, to function as a mapping server.

FIG. 7 provides a functional block diagram illustration of general-purpose computer hardware platforms. FIG. 7 illustrates a network or host computer platform 700, as may typically be used to implement a server like the mapping server system 440. It is believed that those skilled in the art are familiar with the structure, programming, and general operation of such computer equipment and as a result, the drawings should be self-explanatory.

A platform for a server or the like 700, for example, may include a data communication interface for packet data communication 760. The platform may also include a central processing unit (CPU) 720, in the form of one or more processors, for executing program instructions. The platform typically includes an internal communication bus 710, program storage, and data storage for various data files to be processed and/or communicated by the platform such as ROM 730 and RAM 740. The hardware elements, operating systems, and programming languages of such equipment are conventional in nature, and it is presumed that those skilled in the art are adequately familiar therewith. The server 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving, by a device and from an electronic device; associated with a user, and over a network, user input data that includes at least a destination location;
   determining, by the device, that a distance between a start location and the destination location is equal to or above a pre-determined distance threshold;
   generating, by the device, a planned route from the start location to the destination location;
   providing, by the device and for display by the electronic device, an electronic map that includes the planned route;
   providing, by the device and for display by the electronic device, and based on determining that the distance is equal to or above the pre-determined distance threshold, a pin icon along the planned route,
      the pin icon being movable along the planned route,
      the pin icon being provided for display at an intermediate point along the planned route,
      the pin icon being provided for display prior to information about a point of interest (POI), of a plurality of POIs, being provided for display on the planned route, and
      the pin icon being provided for display prior to travel of the planned route;
   receiving, by the device and from the electronic device, a drop location indicating a location along the planned route at which the pin icon is moved and dropped, the drop location being received prior to travel of the planned route;
   calculating, by the device, a snap location, along the planned route, that is closest to the drop location,
      the snap location being associated with the POI, and
      the snap location being calculated prior to travel of the planned route;
   providing, by the device and for display by the electronic device, animated movement of the pin icon from the drop location to the snap location,
      the animated movement being provided prior to travel of the planned route; and
   providing, by the device and for display by the electronic device, the geographical mapping information associated with the POI,
      the information associated with the POI being provided for display prior to travel of the planned route.

2. The method of claim 1, wherein the pre-determined distance threshold is input by the user.

3. The method of claim 1, wherein the drop location is within a pre-determined distance from the snap location.

4. The method of claim 1, further comprising:
   providing, for display by the electronic device, animated movement of the pin icon along the planned route to the drop location.

5. The method of claim 1, further comprising:
   automatically updating information associated with the planned route, based on movement of the pin icon along the planned route to the drop location, to generate updated information associated with the planned route; and
   providing, for display by the electronic device, the updated information associated with the planned route.

6. The method of claim 1, further comprising:
   calculating one or more intersections close to the drop location; and
   determining particular POIs, of the plurality of POIs, within a predetermined distance from the one or more intersections.

7. The method of claim 6, wherein the particular POIs are based on the user input data.

8. The method of claim 6, wherein at least one of the one or more intersections is a highway exit.

9. The method of claim 1, further comprising:
   accessing a database, associated with an external content provider, based on the drop location; and
   enabling a transaction to be performed with the external content provider based on accessing the database.

10. The method of claim 1, wherein the pin icon changes appearance based on the animated movement of the pin icon from the drop location to the snap location.

11. The method of claim 1, further comprising:
   receiving additional user input data after providing for display the information associated with the POI.

12. The method of claim 1, wherein the snap location is calculated based on a shortest travel time from the drop location to the snap location.

13. The method of claim 1, wherein the snap location is closer to the destination location than the drop location.

14. The method of claim 1, wherein the snap location is closer to the start location than the drop location.

15. The method of claim 1, wherein at least one of the start location and the destination location are movable.

16. The method of claim 1, further comprising:
   receiving information identifying an intermediate location between the start location and the destination location.

17. A system comprising:
a memory to store instructions; and
a processor, to execute the instructions in the memory, to:
- receive, from an electronic device associated with a user, and over a network, user input data that includes at least a destination location;
- determine that a distance between a start location and the destination location is equal to or above a pre-determined distance threshold;
- generate a planned route from the start location to the destination location;
- provide, for display by the electronic device, an electronic map that includes the planned route;
- provide, for display by the electronic device, and based on determining that the distance is equal to or above the pre-determined distance threshold, a pin icon along the planned route,
  - the pin icon being movable along the planned route,
  - the pin icon being provided for display at an intermediate point along the planned route,
  - the pin icon being provided for display prior to information about a point of interest (POI), of a plurality of POIs, being provided for display on the planned route, and
  - the pin icon being provided for display prior to travel of the planned route;
- receive, from the electronic device, a drop location indicating a location along the planned route at which the pin icon is moved and dropped,
  - the drop location being received prior to travel of the planned route;
- calculate a snap location, along the planned route, that is closest to the drop location,
  - the snap location being associated with the POI, and
  - the snap location being calculated prior to travel of the planned route;
- provide, for display by the electronic device, animated movement of the pin icon from the drop location to the snap location,
  - the animated movement being provided prior to travel of the planned route; and
- provide, for display by the electronic device, information associated with the POI,
  - the information associated with the POI being provided for display prior to travel of the planned route.

18. The system of claim 17, where the processor is further to:
provide, for display by the electronic device, animated movement of the pin icon along the planned route to the drop location.

19. The system of claim 17, wherein the pin icon changes appearance based on the animated movement of the pin icon from the drop location to the snap location.

20. The system of claim 17 wherein the snap location is calculated based on a shortest travel time from the drop location to the snap location.

21. A non-transitory computer-readable medium storing instructions, the instructions comprising:
one or more instructions that, when executed by a processor, cause the processor to:
- receive, from an electronic device associated with a user, and over a network, user input data that includes at least a destination location;
- determine that a distance between a start location and the destination location is equal to or above a pre-determined distance threshold;
- generate a planned route from the start location to the destination location;
- provide, for display by the electronic device, an electronic map that includes the planned route;
- provide, for display by the electronic device, and based on determining that the distance is equal to or above the pre-determined distance threshold, a pin icon along the planned route,
  - the pin icon being movable along the planned route,
  - the pin being provided for display at an intermediate point along the planned route,
  - the pin icon being provided for display prior to information about a point of interest (POI), of a plurality of POIs, being provided for display on the planned route, and
  - the pin icon being provided for display prior to travel of the planned route;
- receive, from the electronic device, a drop location indicating a location along the planned route at which the pin icon is moved and dropped,
  - the drop location being received prior to travel of the planned route;
- calculate a snap location, along the planned route, that is closest to the drop location,
  - the snap location being associated with the POI, and
  - the snap location being calculated prior to travel of the planned route;
- provide, for display by the electronic device, animated movement of the pin icon from the drop location to the snap location,
  - the animated movement being provided prior to travel of the planned route; and
- provide, for display by the electronic device, information associated with the POI,
  - the information associated with the POI being provided for display prior to travel of the planned route.

* * * * *